United States Patent

Schinnerer

(10) Patent No.: US 6,657,631 B1
(45) Date of Patent: Dec. 2, 2003

(54) REAL TIME CONTROL OF MULTIPLE COMPRESSION TECHNIQUES WITHIN A GRAPHICS DISPLAY SUBSYSTEM

(75) Inventor: James A Schinnerer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 384 days.

(21) Appl. No.: 09/629,127

(22) Filed: Jul. 31, 2000

(51) Int. Cl.$^7$ ................................ G06F 15/16
(52) U.S. Cl. .................. 345/502; 345/555; 345/202; 709/247
(58) Field of Search .................. 345/501–502, 345/555, 560, 605, 556, 202, 130; 382/232–253, 166, 329; 709/247; 711/68

(56) References Cited

U.S. PATENT DOCUMENTS

| | | | |
|---|---|---|---|
| 5,179,651 A | 1/1993 | | Taaffe |
| 5,228,098 A | 7/1993 | | Crinon |
| 5,408,542 A | 4/1995 | | Callahan |
| 5,796,864 A | 8/1998 | * | Callahan |
| 5,819,740 A | 10/1998 | | Muhlenberg |
| 5,982,937 A | 11/1999 | * | Accad |
| 6,088,395 A | 7/2000 | | Wang |
| 6,289,118 B1 | 9/2001 | | Cossey |
| 6,307,557 B1 | 10/2001 | * | Deering |
| 6,366,289 B1 | 4/2002 | | Johns |
| 6,373,890 B1 | 4/2002 | * | Freeman |

* cited by examiner

Primary Examiner—Matthew C. Bella
Assistant Examiner—Hao Nguyen
(74) Attorney, Agent, or Firm—Leslie P. Gehman

(57) ABSTRACT

In a computer graphics system, displaying any given graphics data on a monitor, the type of compression of screen data is chosen during processing. Further, the compression technique is allowed to vary on a per row basis within a block of pixels. The type of compression is encoded with the screen data and stored in screen memory. As the compressed graphics is read from screen memory just prior to display, the screen data is decompressed.

33 Claims, 12 Drawing Sheets

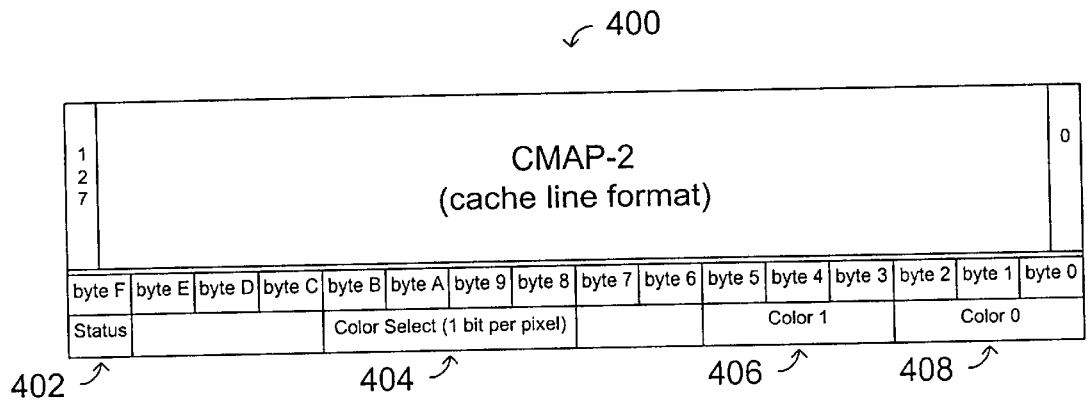
FIG. 4
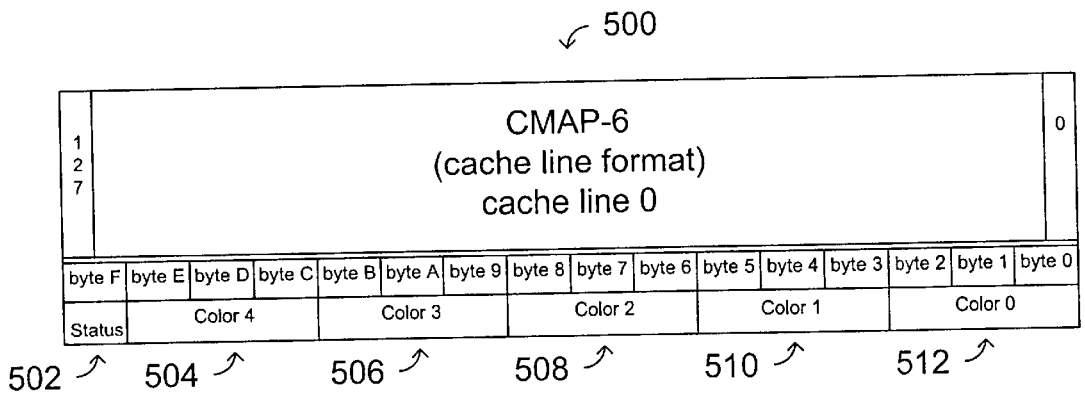
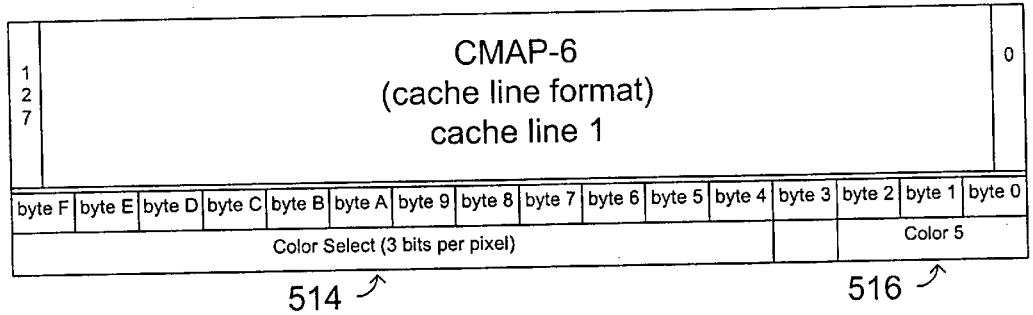
FIG. 5

|   | Status | Description |
|---|---|---|
| 706 | 000 | The next pixel is equal to the previous pixel - no data bits are encoded. |
| 708 | 001 | The difference adder for the next pixel is 3 bits, 1 bit per color. |
| 710 | 010 | The difference adder for the next pixel is 6 bits, 2 bits per color. |
| 712 | 011 | The difference adder for the next pixel is 9 bits, 3 bits per color. |
| 714 | 100 | The difference adder for the next pixel is 12 bits, 4 bits per color. |
| 716 | 101 | The difference adder for the next pixel is 15 bits, 5 bits per color. |
| 718 | 110 | The difference adder for the next pixel is 18 bits, 6 bits per color. |
| 720 | 111 | The next pixel is encoded as a 24-bit RGB value. |

| 127 | Delta-X (X=3, 4, or 5) (cache line format) cache line 0 | 0 |
|---|---|---|

| byte F | byte E | byte D | byte C | byte B | byte A | byte 9 | byte 8 | byte 7 | byte 6 | byte 5 | byte 4 | byte 3 | byte 2 | byte 1 | byte 0 |
|---|---|---|---|---|---|---|---|---|---|---|---|---|---|---|---|
| Status | 1st pixel (RGB) | | | subsequent pixel status and difference data | | | | | | | | | | | |

| | ↙1002 | ↙1004 | ↙1006 | ↙1008 | ↙1010 | ↙1012 |
|---|---|---|---|---|---|---|
| | Pixel # | Pixel Value | Difference Adder | Status | # of Encoded Bits | Location in 1st cache line |
| 1014↘ | 1 | 45-37-dc | N/A | N/A | 24 | [119:96] |
| 1016↘ | 2 | 46-37-dc | 01-00-00 | 001 | 3 + 3 | [95:90] |
| 1018↘ | 3 | 46-37-dc | 00-00-00 | 000 | 3 + 0 | [89:87] |
| 1020↘ | 4 | b4-65-44 | 6e-2e-68 | 111 | 3 + 24 | [86:60] |
| 1022↘ | 5 | b7-66-45 | 03-01-01 | 011 | 3 + 9 | [59:48] |
| 1024↘ | 6 | b6-66-43 | ff-00-fe | 010 | 3 + 6 | [47:39] |

| Scanline | Comp ID | Count | Description of Screen Buffer Data |
|---|---|---|---|
| FB BYTE | 000 | 0 | |
| 0 | 000 | 0 | CMAP-2, 1 cache line |
| 1 | 010 | 0 | CMAP-2, 1 cache line |
| 2 | 010 | 0 | CMAP-10, 3 cache lines |
| 3 | 110 | 1 | CMAP-10, 3 cache lines |
| 4 | none | none | No compression |
| 5 | 111 | 0 | Delta-4, 4 cache lines |
| 6 | 110 | 0 | Delta-5, 5 cache lines |
| 7 | 101 | 3 | Delta-4, 4 cache lines |
| 8 | none | none | No compression |
| 9 | none | none | No compression |
| 10 | none | none | No compression |
| 11 | 101 | 0 | Delta-3, 3 cache lines |
| 12 | 110 | 0 | Delta-3, 3 cache lines |
| 13 | X | X | Delta-4, 4 cache lines |

REAL TIME CONTROL OF MULTIPLE COMPRESSION TECHNIQUES WITHIN A GRAPHICS DISPLAY SUBSYSTEM

FIELD OF THE INVENTION

This invention relates generally to the field of computer graphics and more particularly to the field of data compression within a computer graphics system.

BACKGROUND OF THE INVENTION

Computer graphics workstations are used for a number of different applications such as computer-aided design (CAD) and computer-aided manufacturing (CAM). These applications often require three dimensional (3D) modeling capability and generally require greater speed in rendering more complicated models as time progresses.

Thus pressure is placed on designers of computer graphics workstations to perform more complicated calculations to provide more accurate rendering of models in shorter amounts of time. Many design techniques are used by workstation designers to achieve these goals.

One possible embodiment of a computer graphics accelerator is shown in FIG. 2. This system is described in detail below. For now, note that the tile builder, texture mapper, and display unit all communicate with a single frame buffer memory through a memory controller. In this embodiment the frame buffer memory contains the texture data in addition to the data required for display and the data that is being manipulated prior to display (double buffering). Since the frame buffer memory is accessed by different functions, the memory controller must contain arbitration logic to determine which function has access to the frame buffer memory at any given moment. Sometimes two or more functions will require access to the frame buffer memory at the same time and the memory controller must prioritize these requests. Thus, there is a need in the art for techniques that reduce accesses to the frame buffer memory or otherwise improve graphics performance.

SUMMARY OF THE INVENTION

In a computer graphics system, displaying any given graphics data on a monitor, the type of compression of screen data is chosen during processing. Further, the compression technique is allowed to vary on a per row basis within a block of pixels. The type of compression is encoded with the screen data and stored in screen memory. As the compressed graphics is read from screen memory just prior to display, the screen data is decompressed.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4 is a graphical representation of a cache line in the CMAP-2 data format.

FIG. 5 is a graphical representation of two cache lines in the CMAP-6 data format.

FIG. 7 is a table containing a description of the status bits used in the variable delta data compression technique.

FIG. 8 is a graphical representation of a first cache line in the data format of the variable delta data compression technique.

FIG. 10 is a table containing graphics data for an example of the application of a data compression technique.

FIG. 11 is a graphical representation of the resulting compressed graphics data from the example data shown in FIG. 10.

FIG. 12 is a table containing status byte data for an example of the control of multiple compression techniques within a graphics display subsystem.

DETAILED DESCRIPTION

Figure 1:
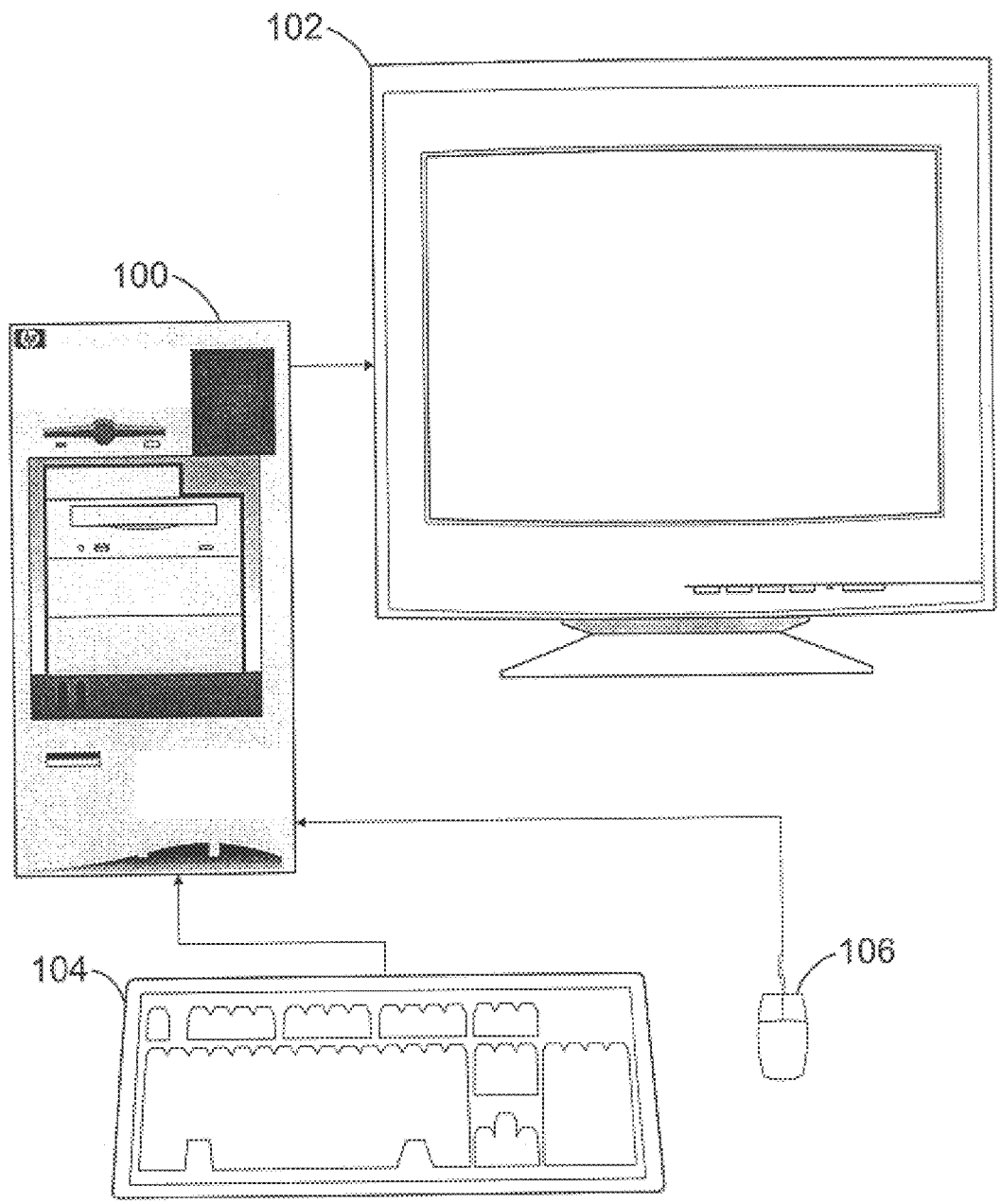
FIG. 1 is an illustration of a computer system.

FIG. 1 is an illustration of a computer system. Most computer systems include hardware dedicated to the display of graphics on a monitor. The computer 100 is controlled by the user with a keyboard 104 and a mouse 106. An output of the computer is displayed on a monitor 102.

Figure 2:
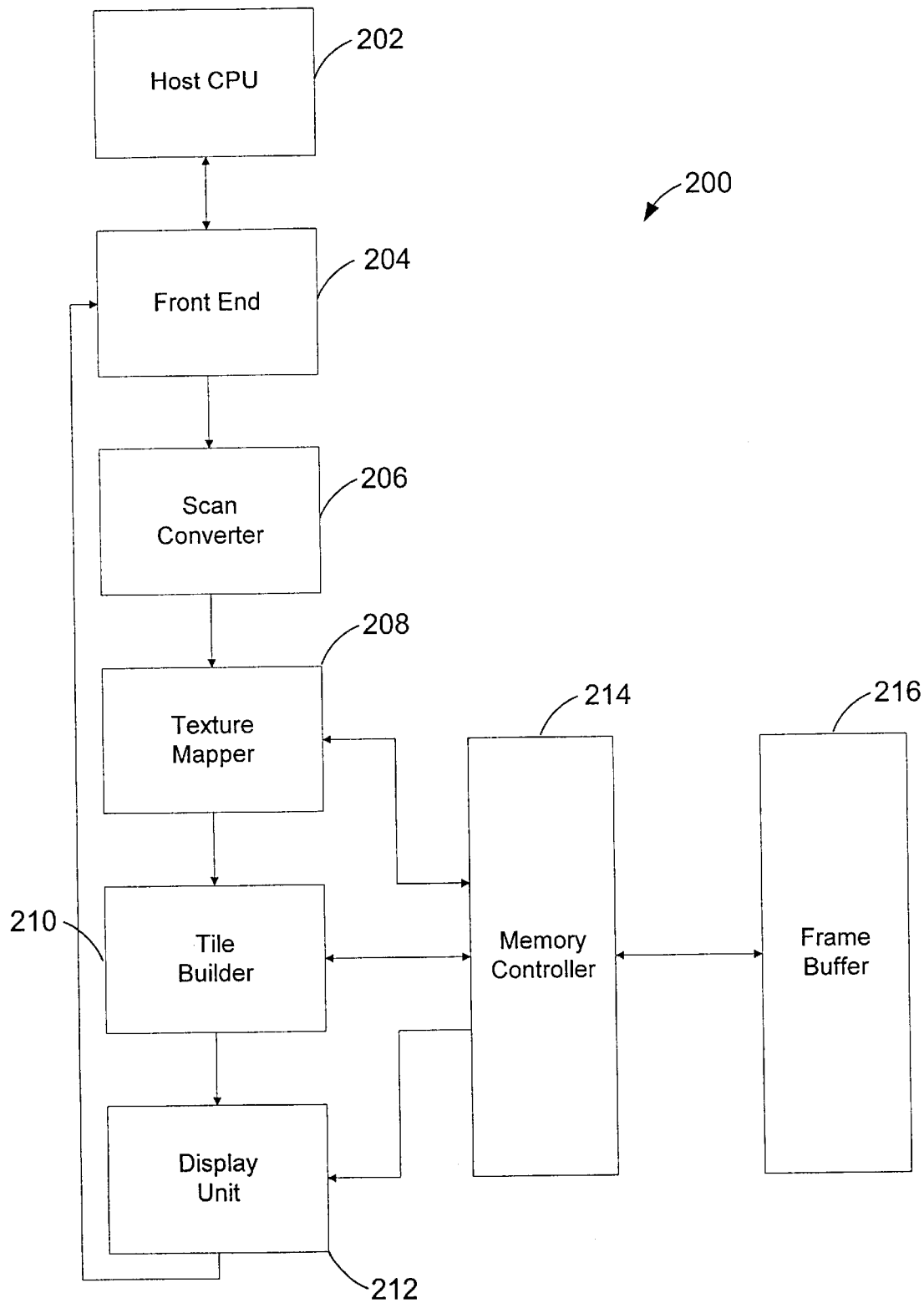
FIG. 2 is a block diagram of a computer graphics system.

A block diagram of the graphics hardware for one such configuration is shown in FIG. 2. The graphics system 200 comprises a number of blocks of circuitry that communicate with each other and the host central processing unit (CPU) 202. The host CPU 202 generates the graphical image in a format that the graphics system 200 understands. Typically, objects are divided into triangles, and the vertices of the triangles are sent to the graphics system 200 for display. The front end 204 of the graphics system 200 controls communication with the host CPU 202. The front end 204 may request information from the host CPU 202 or receive graphics data from the host CPU 202 to then be passed along to the rest of the graphics system 200 hardware. The scan converter 206 receives vertex data and plane equations from the front end 204 and converts them into spans of pixels. Scan conversion (also known as rasterization) may be accomplished by the use of any of several algorithms known in the art. Since most computer memory is most efficiently accessed in blocks of data, the graphics data should be assembled into appropriate sized tiles. This tile assembly task is performed by the tile builder 210. The tile builder 210 also sends and receives tiles to and from the frame buffer 216 through the memory controller 214. The frame buffer 216 may consist of synchronous dynamic random access memory (SDRAM) and is used to store the pixel data for the image while the graphics system 200 is creating the pixel data before it is displayed on the monitor. The texture mapper 208 applies textures to surfaces. These textures are stored in memory in the frame buffer 216 for application to surfaces being rendered. The display unit 212 formats pixel data and sends the data through digital-to-analog converters (DACs) to the monitor 102. Within the display unit 212, pixel data from the frame buffer 216 is formatted for display on the monitor 102. Also, the data must transition from the clock domain of the graphics system 200 to that of the monitor 102 for display. This is typically done through asynchronous first-in-first-out memories (FIFOs). Frame buffer 216 memory is commonly divided into blocks. Each block of memory may store the data for a number of pixels. This block size may be fixed, for example, at 32×32 pixels, or it may be programmable. However, those skilled in the art will recognize that other block sizes, with or without programmability, may be used within the scope of this invention.

Figure 3:
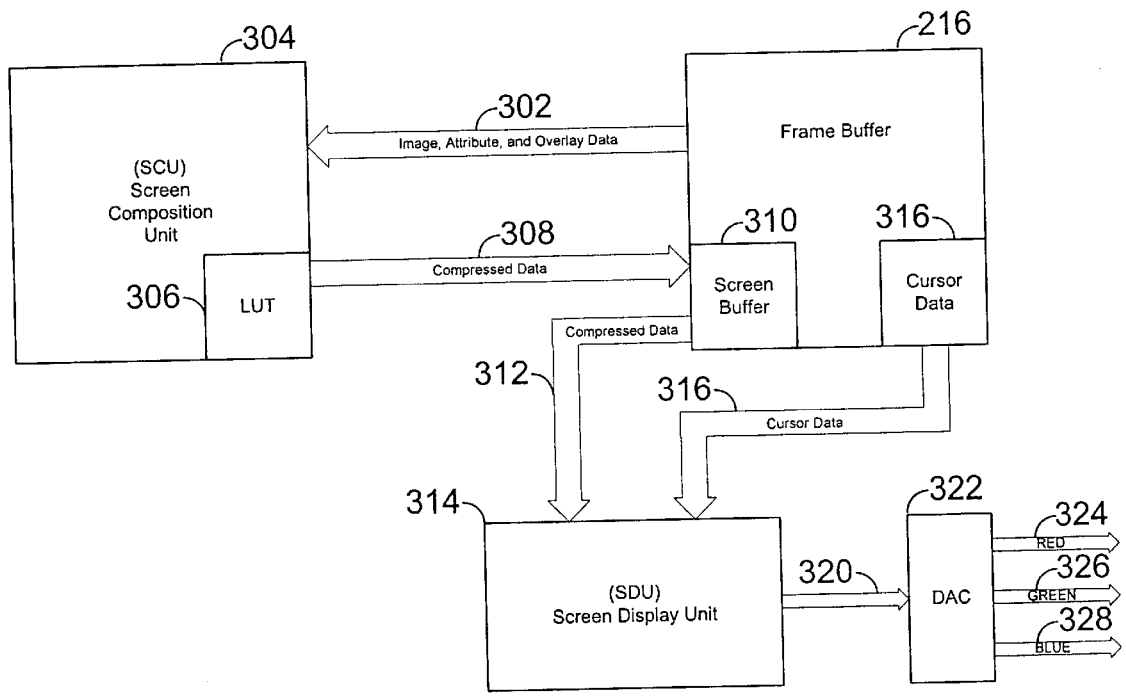
FIG. 3 is a block diagram of a portion of a computer graphics system.

FIG. 3 is a block diagram of a portion of a computer graphics system. The display unit 212 of FIG. 2 is divided into a screen composition unit (SCU) 304 and a screen display unit (SDU) 314. The memory controller 214 of FIG. 2 is not explicitly shown, however it is inherent in controlling the data flow to and from the frame buffer 216. The screen composition unit 304 receives image, attribute, and overlay data 302 from the frame buffer 216, creates the display pixels, and sends compressed screen data 308 to the frame buffer 216 for storage in a screen buffer 310. The screen composition unit 304 also contains a look up table (LUT) 306 that may be used to modify the color data such as may be required for gamma correction. The screen buffer 310 contains the exact 24-bit per pixel color data (with the exception of cursor data and position) that will be displayed on the screen. By storing compressed screen data 308 in the screen buffer 310, the bandwidth required to send data to and from the screen buffer 310 may be minimized. Like the frame buffer 216 itself, the screen buffer 310 memory is divided into blocks. For example, a 32×32 pixel block size is used in the embodiment described in this document. However, those skilled in the art will recognize that other block sizes may be used within the scope of this invention. One of the forces driving screen buffer block size is the size of the cache memories that are contained in the memory controller 214. These cache memories temporarily store the screen data during a read from the screen buffer 310. In the embodiments described herein, a 128-bit cache width is used. However, those skilled in the art will recognize that other sizes of cache may be used within the scope of this invention. In an embodiment using 128-bit cache widths and 24-bit uncompressed color data, each 128-bit cache line is capable of holding 5 24-bit RGB pixels with one byte left over. Therefore, if 6 cache lines are used, 32 24-bit RGB pixels can be stored at once. To achieve the benefits of compression, the number of cache lines required for each screen buffer block must be reduced. Any partially filled cache line will require the same bandwidth as a fully filled cache line. If one cache line can be saved, a compression ration of 6:5 is achieved, and decreased memory bandwidth will result. Simulations on sample image data indicate that 6:5 or better compression may be achieved for more than 99% of the sample data. The compressed screen buffer data 312 is sent to a screen display unit 314. The screen display unit 314 controls all of the monitor 102 timing. Cursor data 316 is also stored in the frame buffer 216 and as needed is sent to the screen display unit 314 and decompressed in hardware. Within the screen display unit 314 the cursor data 316 is merged with the decompressed data from the screen buffer 310 and the final digital screen data 320 is sent to digital-to-analog converters (DACs) 322. Within the DACs 322, the digital screen data 320 is converted to analog red 324, green 326, and blue 328 signals that drive the monitor 102.

Alternative embodiments of this invention may not use DACs sending analog data to the monitor 102. For example, many systems that use flat panel displays use a digital video interface (DVI) to send digital data directly to the display. Those skilled it the art will recognize that this alternate configuration of the display drivers may be used within the scope of this invention.

Often, the images displayed on a screen include areas of uniform color, or areas where only a small number of colors are used (for example, backgrounds). Where only a few colors are used, storing complete color data for each pixel is a great waste of memory and bandwidth. Instead, a color map may be created allowing the full color data to be mapped to a much smaller color select. For example, if the region only contains two colors (common in text windows), only a single bit color select is needed to select between the two colors, and for the region, only two colors need to be stored. The color selects for the region would then consist of an array of single-bit data for each of the pixels. Further, in cases using between three and ten different colors, color maps may be built using color selects of three or four bits. These embodiments of color map graphics data compression will be discussed in detail below.

FIG. 4 is a graphical representation of a cache line in the CMAP-2 data format. The CMAP-2 data compression technique is used for those rows of pixels within a block that contain only two different colors. In this example embodiment, 32×32 pixel blocks and 128-bit cache lines are used, however, those skilled in the art will recognize that different size pixel blocks and cache lines may be used within the scope of this invention. Using the CMAP-2 data compression technique, a full row of 32 pixels containing two different colors may be encoded in a single 128-bit cache line. The CMAP-2 400 cache line format starts with a status byte 402 for the next compressed row stored in byte F. This status byte 402 will be discussed fully in the detailed description of FIG. 9. The one bit per pixel color select data 404 for the 32 pixels in the current row is stored in bytes B, A, 9, and 8. Next, the full color data for color 1 406 is stored in bytes 5, 4, and 3, while the full color data for color 0 408 is stored in bytes 2, 1, and 0. Thus, all of the color data needed for the 32 pixels in the current row is stored in a single cache line.

FIG. 5 is a graphical representation of two cache lines in the CMAP-6 data format. When the current row of pixels contains between three and six different colors, the CMAP-6 data compression technique may be used to store the color data for the 32 pixels within two cache lines. The CMAP-6 500 cache line format starts with a status byte 502 in byte F of the first cache line (cache line 0). The color data for color 4 504 is stored in bytes E, D, and C. The color data for color 3 506 is stored in bytes B, A, and 9. The color data for color 2 508 is stored in bytes 8, 7, and 6. The color data for color 1 510 is stored in bytes 5, 4, and 3. The color data for color 0 512 is stored in bytes 2, 1, and 0. This fills the first cache line (cache line 0). The color select 514 for each of the 32 pixels in the row is stored in bytes F through 4 of the second cache line (cache line 1). The color data for color S 516 is stored in bytes 2, 1, and 0. Six different colors are the maximum that can be stored in two cache lines in this embodiment, since each color requires three bytes and each color select requires three bits to select between the six colors.

Figure 6:
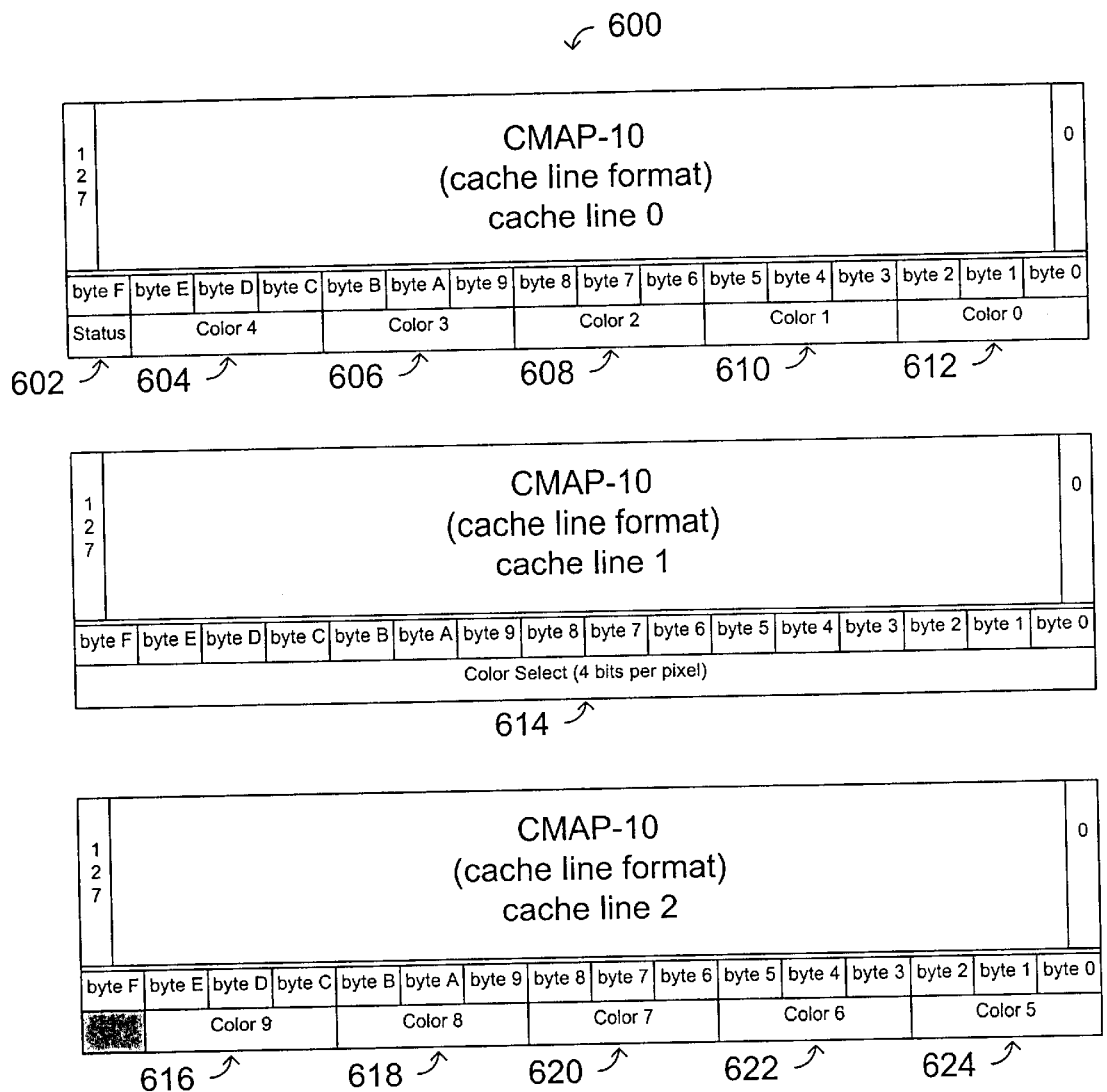
FIG. 6 is a graphical representation of three cache lines in the CMAP-10 data format.

FIG. 6 is a graphical representation of three cache lines in the CMAP-10 data format. When the current row of pixels contains between seven and ten different colors, the CMAP-10 data compression technique may be used to store the color data for the 32 pixels within three cache lines. The CMAP-10 600 cache line format starts with a status byte 602 in byte F of the first cache line (cache line 0). The color data for color 4 604 is stored in bytes E, D, and C. The color data for color 3 606 is stored in bytes B, A, and 9. The color data for color 2 608 is stored in bytes 8, 7, and 6. The color data for color 1 610 is stored in bytes 5, 4, and 3. The color data for color 0 612 is stored in bytes 2, 1, and 0. This fills the first cache line (cache line 0). The color select 614 data for the 32 pixels in the current row is stored in the second cache line (cache line 1). Four bits per pixel are required for the color select to choose between the ten different colors. For 32 pixels, 128 bits are required for the color select data and this completely fills the second cache line (cache line 1). The color data for color 9 616 is stored in bytes E, D, and C of the third cache line (cache line 2). The color data for color 8 618 is stored in bytes B, A, and 9. The color data for color 7 620 is stored in bytes 8, 7, and 6. The color data for color 6 622 is stored in bytes 5, 4, and 3. The color data for color 5 624 is stored in bytes 2, 1, and 0. The first byte (byte F) of the third cache line (cache line 2) is not used.

Many images (including 3D rendered images) contain smooth transitions within their color data. For example, across a rendered image of a blue sphere, the shade of the blue color may gradually darken from one side to the other, depending on the lighting. Rarely will there be sudden jumps in color, for example from pure blue to pure red within an image such as the blue sphere. Thus, within a scan line crossing the image, the shade of blue may change slightly from one pixel to the next. By storing a starting pixel color and then storing a numerical representation of the change (or delta) of color to the next pixel, this color delta may be applied to the color of the starting pixel to obtain the color of the next pixel. Naturally, the amount of color change from one pixel to the next may be variable both across an image and even across a single scan line. Thus, any compression technique capable of only storing the minimum amount of data needed for any given delta, instead of using a fixed amount of data for all of the color deltas within a given block, will further reduce data storage needs (and bandwidth). By allowing the size of the delta data (measured in bits-per-pixel) to vary, a compression technique may greatly reduce the data needed to display a given image, even if only part of the image contains color data that is smoothly and gradually changing. For very smooth images where the pixel values are not changing significantly, the difference between adjacent pixels may be small or even zero. In this case, very few bits are required to encode the next pixel. For images that have texture applied or other non-smooth characteristics, a larger difference value may be needed. The variable delta compression technique uses three status bits to change the width of the correction (or delta) value on a per pixel basis. This assures that the compressed data is as small as possible. The variable delta compression technique is described further in a U.S. patent application, HP docket number 10001778-1, 'Variable Delta Compression for Display Data in a Computer Workstation Graphics System', filed on or about the same date as the present application, hereby incorporated herein by reference.

FIG. 7 is a table containing a description of the status bits used in the variable delta data compression technique. The status column 702 contains each of the possible 3-bit status values. The description column 704 contains descriptions of each of the possible 3-bit status values. Status='000' 706 is used when the next pixel is equal to the previous pixel, therefore no data bits are encoded. Status='001' 708 is used when the delta for the next pixel is 3 bits, with 1 bit per RGB (red/green/blue) color. Status='010' 710 is used when the delta for the next pixel is 6 bits, with 2 bits per color. Status='011' 712 is used when the delta for the next pixel is 9 bits, with 3 bits per color. Status='100' 414 is used when the delta for the next pixel is 12 bits, with 4 bits per color. Status='101' 716 is used when the delta for the next pixel is 15 bits, with 5 bits per color. Status='110' 718 is used when the delta for the next pixel is 18 bits, with 6 bits per color. Status='111' 720 is used when the next pixel is encoded as a full 24-bit RGB value, with 8 bits per color.

Because the size of the compressed data is data dependent, the number of cache lines needed to represent a 32-pixel line is not predictable. In an example embodiment the number of cache lines used can be three, four, or five. If the variable delta technique uses the sixth cache line, the compression fails and the data is not compressed. In an example embodiment, in the rare case that the variable delta compression only uses two cache lines, three cache lines will still be written, however, the third will contain invalid data that is not used. The number of cache lines used is encoded in a status byte, that will be described in detail below.

FIG. 8 is a graphical representation of a first cache line in the data format of the variable delta data compression technique. The first cache line 800 shown in FIG. 8 has 128 bits numbered from bit 127 through bit 0. The number of cache lines used is encoded in the status byte 802 (byte F). This status byte 802 is shown in further detail in FIG. 9. The 24 bits of RGB data for the first pixel 804 in the line are stored in bytes C, D, and E. The remainder of the first cache line 800 comprises subsequent pixel status and delta data 806. The subsequent pixel status and delta data 806 structure will be shown in detail in an example shown in FIGS. 9 and FIG. 10. Since the graphics processor needs to know how many cache lines of data to read from the screen buffer 310 for the first line of pixels in the block before it starts to read the screen buffer 310, a small array of status bytes is stored in the frame buffer 216. This array of status bytes contains one status byte for each block of pixels in the screen buffer 310. The screen display unit then starts reading a block of pixels from the screen buffer 310 by first reading the status byte for that block from the array of status bytes. The first status byte contains information needed for the screen display unit to read the compressed data for the first line of pixels within the block. The status byte 802 stored in byte F of the first cache line for the first line of pixels then contains the information needed for the screen display unit to read the screen buffer 310 data for the next compressed line of display data within the block.

Since each line of data contains information about the next compressed line of data, the screen data for a block is written to the screen buffer 310 in the reverse direction from which it is read. For example, many computer graphics systems read pixel data from top to bottom, one line at a time. In this case the screen data for a block would be composed from bottom to top, so that the bottom line is compressed first and it's status is included in the data for the line above it, and so on. After the top line of the block is compressed and written to the screen buffer 310, the status byte for the top line is stored in the small array of status bytes discussed previously.

Figure 9:
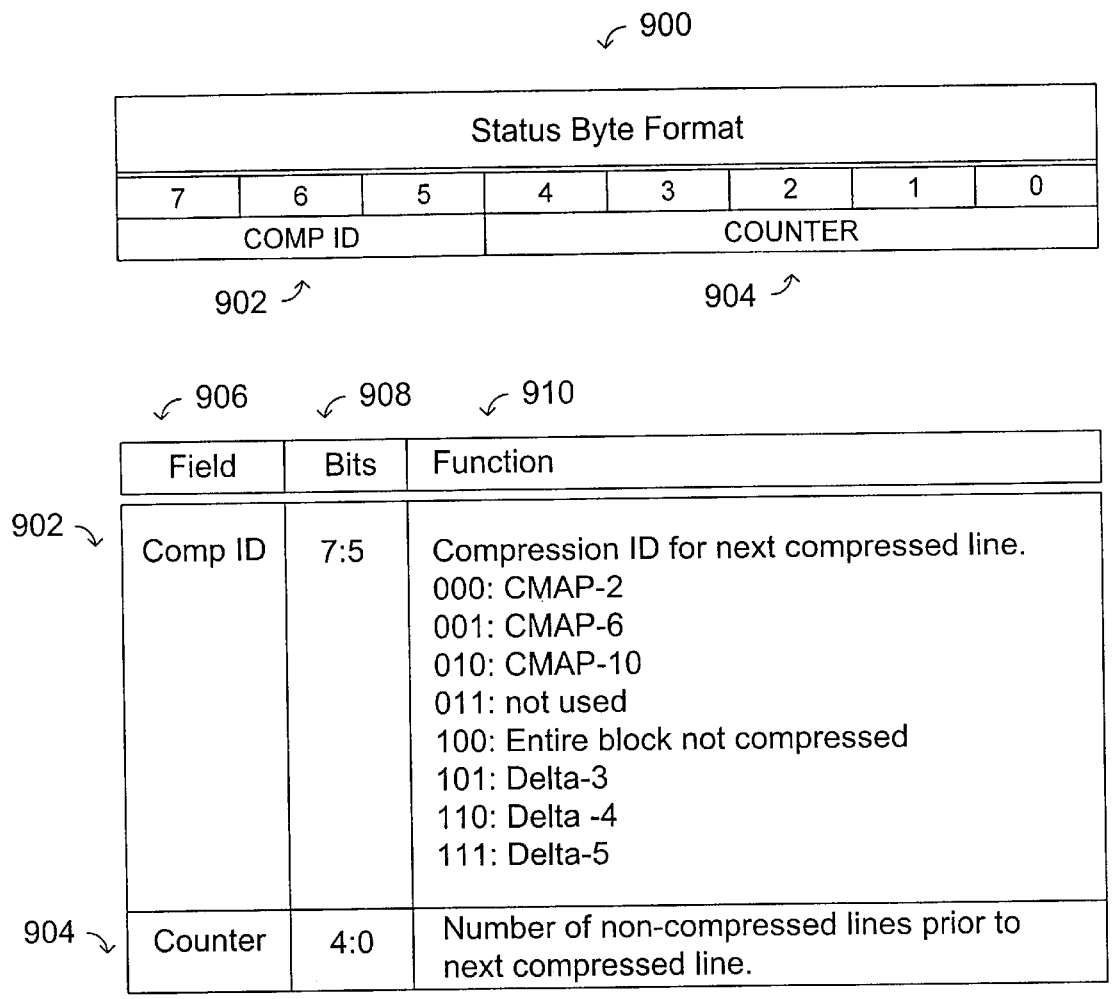
FIG. 9 is a graphical representation of the status byte format used in a data compression technique.

FIG. 9 is a graphical representation of the status byte format used in a data compression technique. The status byte format 900 includes three bits of compression identification (Comp ID) 902 and a five bit counter 904. Comp ID 902 is stored in bits [7:5] of the status byte while the counter 904 is stored in bits [4:0]. The table in FIG. 6 shows the encoding used in the status byte. The field name 906, bit location 908, and function 910 are shown for the Comp ID 902 and counter 904 fields. The Comp ID 902 contains three bits corresponding to the type of compression used for the next compressed line of pixels within the current block of pixels. When CMAP-2 compression is used, the Comp ID 902 is set to binary '000'. When CMAP-6 compression is used, the Comp ID 902 is set to binary '001'. When CMAP-10 compression is used, the Comp ID 902 is set to binary '010'. When the entire block is not compressed Comp ID 902 is set to binary '100'. When the next compressed line is compressed using the variable delta technique and the data for the next compressed line is stored in three cache lines (Delta-3 mode), Comp ID 902 is set to binary '101'. When the next compressed line is compressed using the variable delta technique and the data for the next compressed line is stored in four cache lines (Delta-4 mode), Comp ID 902 is set to binary '110'. When the next compressed line is compressed using the variable delta technique and the data for the next compressed line is stored in five cache lines (Delta-5 mode), Comp ID 902 is set to binary '111'. Note that the Comp ID 902 bits contain information about the 'next compressed line', not the 'next line'. If the next line (or lines) is not compressed, the counter 904 will be set to a non-zero value that represents how many non-compressed lines precede the next compressed line.

FIG. 10 is a table containing screen data for an example of the application of a data compression technique. This example shows the compression of six pixels using the variable delta compression technique. The first column of the table contains the pixel number 1002. The second column of the table contains the RGB pixel value 1004 (in hexadecimal). The third column of the table contains the difference (or delta) 1006 between the current pixel and the previous pixel. This delta 1006 may also be viewed as the value to be added to the previous pixel's RGB value to generate the RGB value for current pixel. The fourth column of the table contains the three-bit status 1008 value as detailed in FIG. 4 for the current pixel. The fifth column of the table contains the number of encoded bits 1010 needed to store the compressed data for the current pixel. The sixth column shows the location 1012 in the first cache line of the data for the current pixel.

In this example, the first pixel 1014 has an RGB value of '45-37-dc' (in hexadecimal). Since it is the first pixel in current scan line, it is stored as a full 24-bit RGB value and the delta 1006 and status 1008 fields are not used. Since the first byte of the first cache line contains the status byte 900 shown in FIG. 6, the first pixel is stored in bits [119:96] of the first cache line. The second pixel 1016 has an RGB value of '46-37-dc'. The only difference between the second pixel 1016 and the first pixel 1014 is that the red value has changed from 45 to 46. Thus, the difference from the first pixel 1014 to the second pixel 1016 is '01-00-00'. The three-bit status 1008 of the second pixel 1016 contains binary '001' which signals that the delta 1006 for the second pixel 1016 is stored in three bits with one bit per color (see FIG. 6). The number of encoded bits for the second pixel 1016 totals six. Three bits are used to store the status 1008, and the delta 1006 is stored in the three bits following the status 1008. These six bits are stored in bits [95:90] of the first cache line. The third pixel 1018 has an RGB value of '46-37-dc'. Thus, there is no difference between the third pixel 1018 and the second pixel 1016. The three-bit status 1008 of the third pixel 1018 contains binary '000' which signals that there is no difference between the third pixel 1018 and the second pixel 1016 and thus no need to store any delta information. Thus, the encoded bits 1010 for the third pixel 1018 are the three bits needed to store the status 1008. These three bits are stored in bits [89:87] of the first cache line. The fourth pixel 1020 has an RGB value of 'b4-65-44'. The difference 1006 between the third pixel 1018 and the fourth pixel 1020 is '6e-2e-68'. Since this delta requires more than six bits to store the delta for at least one of the colors, the entire 24-bit value is required for the fourth pixel 1020. (Note that different embodiments of this invention may store either the 24-bit difference or the 24-bit RGB value for the fourth pixel 1020 and still be within the scope of this invention.) Thus, the three-bit status 1008 stored for the fourth pixel 1020 is binary '111' and the number of encoded bits 1010 is 27. Three bits are used to store the status 1008 and the remaining 24 bits are used to store either the delta or the RGB value for the fourth pixel 1020. These 27 bits are stored in bits [86:60] of the first cache line. The fifth pixel 1022 has an RGB value of 'b7-66-45'. The difference 1006 between the fourth pixel 1020 and the fifth pixel 1022 is '03-01-01'. This delta requires three bits of data for each color for a total of nine bits. Thus, the three-bit status 1008 value is '011'. It is important to note here that although the value '3' may be stored in two bits, three bits are actually required to include a sign bit. The one bit per color case is special, in that negative deltas are not allowed in that case. All other variable delta cases require an extra sign bit to be encoded. Thus, the number of encoded bits 1010 for the fifth pixel 1022 is 12. Three bits are required to store the status 1008, and nine bits are needed to store the delta 1006. These 12 bits are stored in bits [59:48] of the first cache line. The sixth pixel 1024 has an RGB value of 'b6-66-43'. The difference 1006 between the fifth pixel 1022 and the sixth pixel 1024 is '(−1)-00-(−2)'. The −1 is stored in a byte as '11111111' (or 'ff' in hexadecimal), and the −2 is stored in a byte as '11111110' (or 'fe' in hexadecimal). In an eight bit binary adder, if 'ff' is added to a number and the carry out is ignored, the result is equal to the number minus one. Likewise, if 'fe' is added to a number and the carry out is ignored, the result is equal to the number minus two. (This is shown in detail in the description of FIG. 9.) The three-bit status 1008 of the sixth pixel 1024 is binary '010' since the delta for the sixth pixel 1024 requires six bits, two bits per color. The number of encoded bits 1010 is nine bits. Three bits are required for the status 1008 and six bits are required to store the delta 1006. These nine bits are stored in bits [47:39] of the first cache line.

Figure 11:
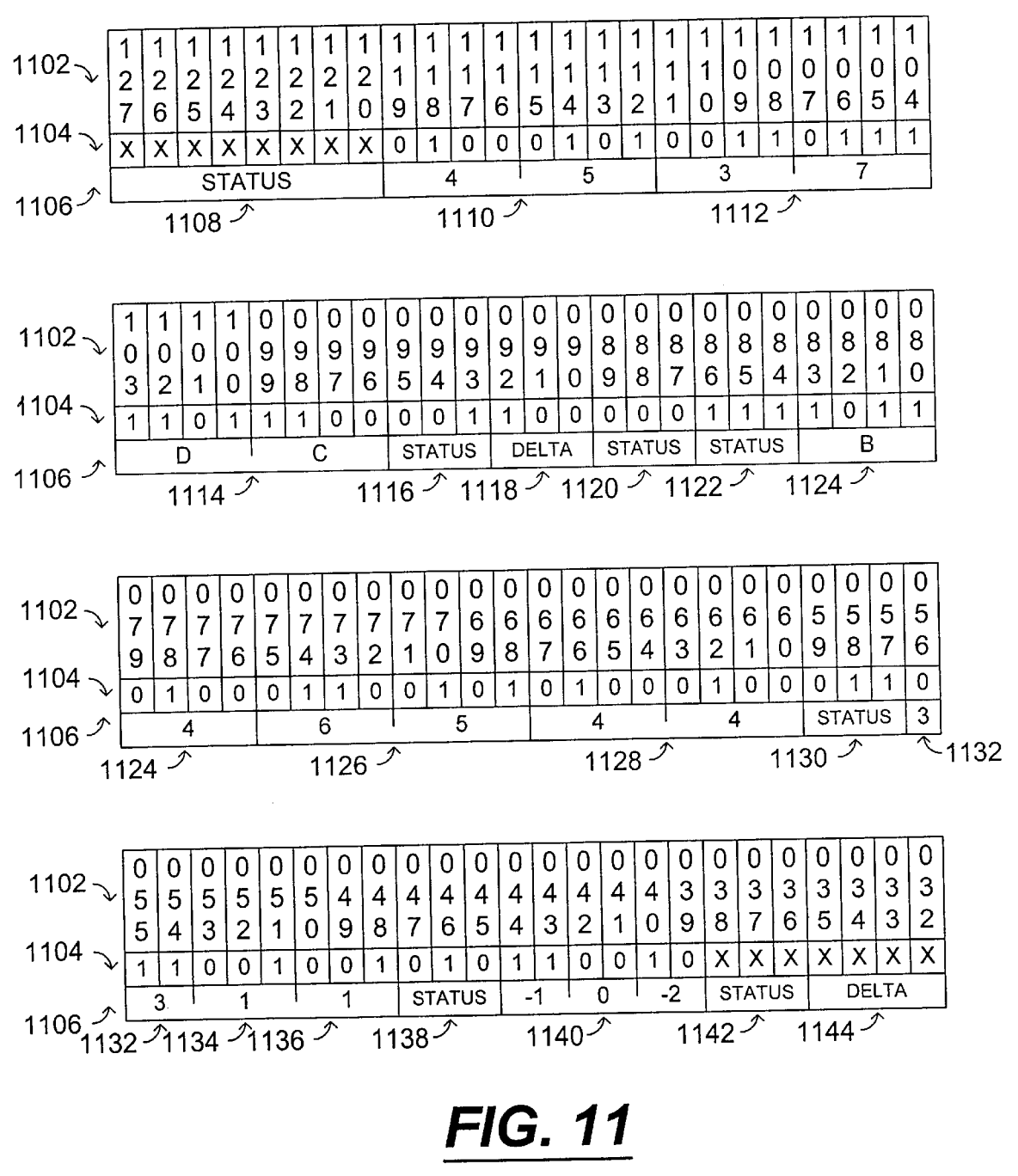

FIG. 11 is a graphical representation of the resulting compressed screen data from the example data shown in FIG. 11. The overall structure of the first cache line is shown in FIG. 8, and FIG. 11 is a detailed representation of the data that would be stored in the first cache line from the example of FIG. 10. FIG. 11 shows the first 12 bytes of the first cache line. The bits 1102 are numbered from 127 through 032. The data 1104 contained within each bit are shown directly below the bit number 1102. Below the data 1104 are descriptions or hexadecimal representations 1106 of the data 1104. The first byte 1108 (bits [127:120]) of the first cache line contain the status byte 802 for the next compressed line of data. The second byte 1110 (bits [119:112]) contains the value '45', which is the red portion of the RGB data for the first pixel 1014. The third byte 1112 (bits [111:104]) contains the value '37', which is the green portion of the RGB data for the first pixel 1014. The fourth byte 1114 (bits [103:96]) contains the value 'dc', which is the blue portion of the RGB data for the first pixel 1014. Bits [95:93] 1116 contain the value '001', which is the status for the second pixel 1016. Bits [92:90] 1118 contain the value '100', which is the delta for the second pixel 1016. Bits [89:87] 1120 contain the value '000', which is the status for the third pixel 1018. Note that no delta value was needed for the third pixel 1018 since it is the same color as the second pixel 1016. Bits [86:84] 1122 contain the value '111', which is the status for the fourth pixel 1020. Bits [83:76] 1124 contain the value 'b4', which is the red delta for the fourth pixel 1020. Bits [75:68] 1126 contain the value '65', which is the green delta for the fourth pixel 1020. Bits [67:60] 1128 contain the value '44', which is the blue delta for the fourth pixel 1020. Bits [59:57] 1130 contain the value '011', which is the status for the fifth pixel 1022. Bits [56:54] 1132 contain the value '3', which is the red delta for the fifth pixel 1022. Bits [53:51] 1134 contain the value '1', which is the green delta for the fifth pixel 1022. Bits [50:48] 1136 contain the value '1', which is the blue delta for the fifth pixel 1022. Bits [47:45] 1138 contain the value '010', which is the status for the sixth pixel 1024. Bits [44:39] 1140 contain the value '10010', which is the delta for the sixth pixel 1024. Bits [38:36] 1142 will contain the status for the seventh pixel and bits [35:xx] 1144 will contain the delta for the seventh pixel.

FIG. 12 is a table containing status byte data for an example of the control of multiple compression techniques within a graphics display subsystem. The example shown in FIG. 12 contains status bytes for 13 scan lines of data. The first column 1202 of the table contains the scan line numbers. The second column 1204 contains the value of the Comp ID 902 bits from the status byte within the given scan line. The third column 1206 contains the value of the counter 904 bits from the status byte within the given scan line. The first row of data contains the status byte from the small array of status bytes stored in the frame buffer. This first status byte contains the Comp ID 902 bits representing the compression technique used to compress the first scan line of compressed data. In this example the Comp ID 902 bits are '000' which signifies that the first compressed line uses CMAP-2 compression as shown in FIG. 9. The counter 904 value for this first status byte is '0' which signifies that there are no uncompressed scan lines before the first compressed scan line. Thus, scan line 0 is decompressed using the CMAP-2 technique. The Comp ID 902 bits from the scan byte stored with scan line 0 are '000' which signifies that the next compressed scan line uses CMAP-2 compression. The counter 904 value for the status byte from scan line 0 is '0' which signifies that there are no uncompressed scan lines before the next compressed scan line. Thus, scan line 1 is decompressed using the CMAP-2 technique. The Comp ID 902 bits from the scan byte stored with scan line 1 are '010' which signifies that the next compressed scan line uses CMAP-10 compression. The counter 904 value for the status byte from scan line 1 is '0' which signifies that there are no uncompressed scan lines before the next compressed scan line. Thus, scan line 2 is decompressed using the CMAP-10 technique. The Comp ID 902 bits from the scan byte stored with scan line 2 are '010' which signifies that the next compressed scan line uses CMAP-10 compression. The counter 904 value for the status byte from scan line 2 is '0' which signifies that there are no uncompressed scan lines before the next compressed scan line. Thus, scan line 3 is decompressed using the CMAP-10 technique. The Comp ID 902 bits from the scan byte stored with scan line 3 are '110' which signifies that the next compressed scan line uses Delta-4 compression. The counter 904 value for the status byte from scan line 3 is '1' which signifies that there is one uncompressed scan line before the next compressed scan line. Thus, scan line 4 does not need to be decompressed, and scan line 5 is decompressed using the Delta-4 technique. Since scan line 4 contains uncompressed data, it does not have a status byte, and the next status byte is in the data for scan line 5. The Comp ID 902 bits from the scan byte stored with scan line 5 are '111' which signifies that the next compressed scan line uses Delta-5 compression. The counter 904 value for the status byte from scan line 5 is '0' which signifies that there are no uncompressed scan lines before the next compressed scan line. Thus, scan line 6 is decompressed using the Delta-5 technique. The Comp ID 902 bits from the scan byte stored with scan line 6 are '110' which signifies that the next compressed scan line uses Delta-4 compression. The counter 904 value for the status byte from scan line 6 is '0' which signifies that there are no uncompressed scan lines before the next compressed scan line. Thus, scan line 7 is decompressed using the Delta-4 technique. The Comp ID 902 bits from the scan byte stored with scan line 7 are '101' which signifies that the next compressed scan line uses Delta-3 compression. The counter 904 value for the status byte from scan line 7 is '3' which signifies that there are three uncompressed scan lines before the next compressed scan line. Thus, scan lines 8, 9, and 10 do not need to be uncompressed and scan line 11 is decompressed using the Delta-3 technique. Since scan lines 8, 9, and 10 contain uncompressed data, they do not have status bytes, and the next status byte is in the data for scan line 11. The Comp ID 902 bits from the scan byte stored with scan line 11 are '101' which signifies that the next compressed scan line uses Delta-3 compression. The counter 904 value for the status byte from scan line 11 is '0' which signifies that there are no uncompressed scan lines before the next compressed scan line. Thus, scan line 12 is decompressed using the Delta-3 technique. The Comp ID 902 bits from the scan byte stored with scan line 12 are '110' which signifies that the next compressed scan line uses Delta-4 compression. The counter 904 value for the status byte from scan line 12 is '0' which signifies that there are no uncompressed scan lines before the next compressed scan line. Thus, scan line 13 is decompressed using the Delta-3 technique. The status byte for scan line 13 is left blank in this example, since it relies on the compression technique used for scan line 14 which is not included in this example.

Those skilled in the art will recognize that other compression techniques can be used within the scope of this invention. Those skilled in the art will also recognize that other configurations of the status bytes are possible, and the status byte in other embodiment may contain less than or more than eight bits and still remain within the scope of this invention.

Figure 13:
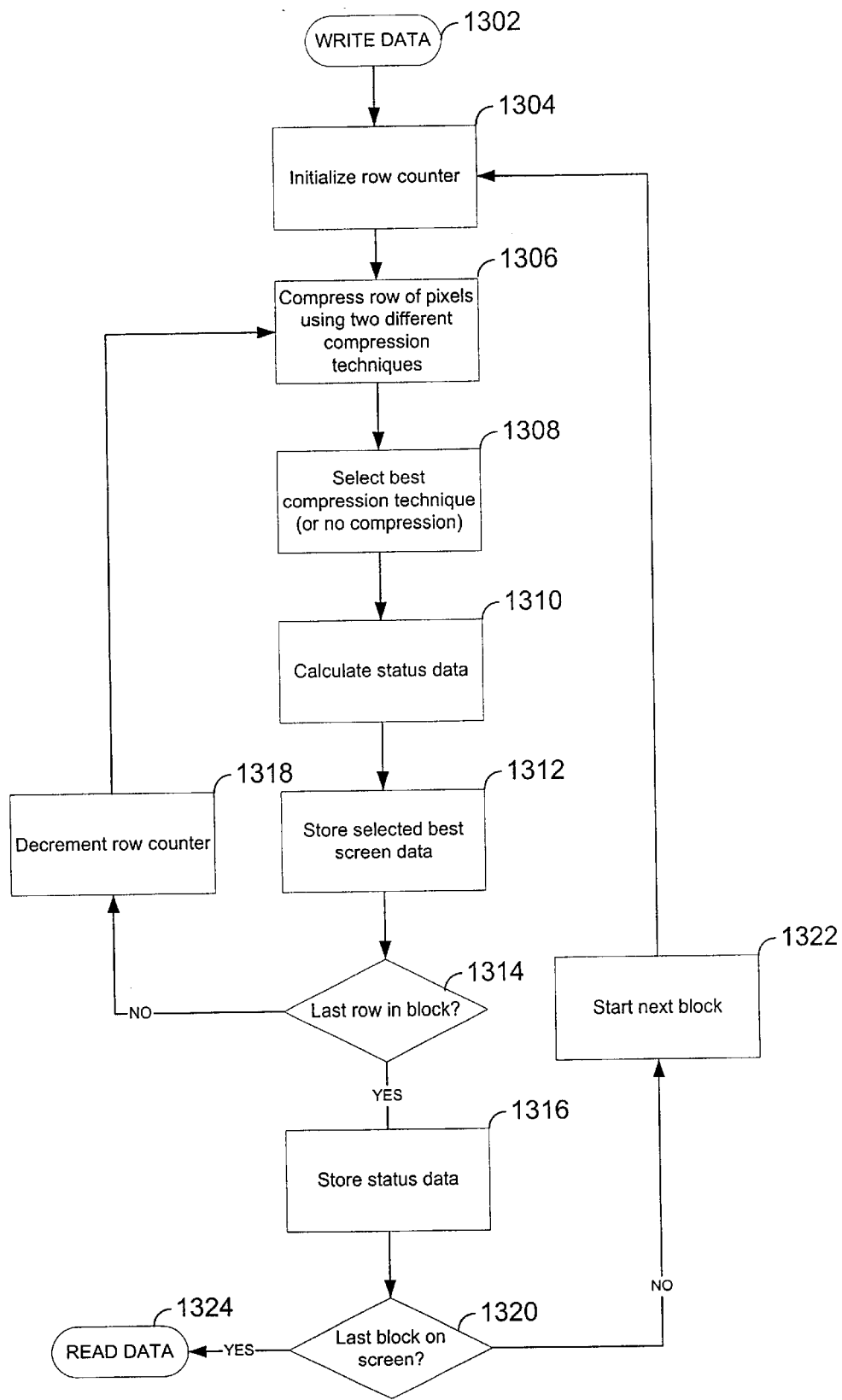
FIG. 13 is a flowchart for a method of writing compressed graphics data to a buffer.

FIG. 13 is a flowchart for a method of writing compressed screen data to a buffer. An example method for encoding screen data using multiple compression techniques is started in a step 1302 labeled 'WRITE DATA'. In a step 1304, a row counter is initialized (in an example embodiment, the row counter is initialized to the bottom row of the current block). In a step 1306, the current row of pixels is compressed using two different compression techniques. In a step 1308, the best method of compression is selected, or, if neither compression technique is effective, the row is stored non-compressed. In a step 1310, status data is calculated from the method of compression used on the current row, or the last compressed row if the current row is stored without compression. The status data also includes the number of non-compressed rows to the next compressed row. In a step 1312, the processed row of screen data is stored in a buffer. In a decision step 1314, if the current row is not the last row in the current block of pixels, in a step 1318, the row counter is decremented and control is returned to step 1306. If the current row is the last row in the current block of pixels, control is passed to a step 1316, where the status data is stored in a buffer. In a decision step 1320, if the current block is not the last block on the screen, in a step 1322, the next block is started and control is passed to step 1304. If the current block is the last block on the screen, in a step 1324, the entire screen is stored in the buffer and may be read from the buffer starting with step 1324, labeled 'READ DATA'.

Figure 14:
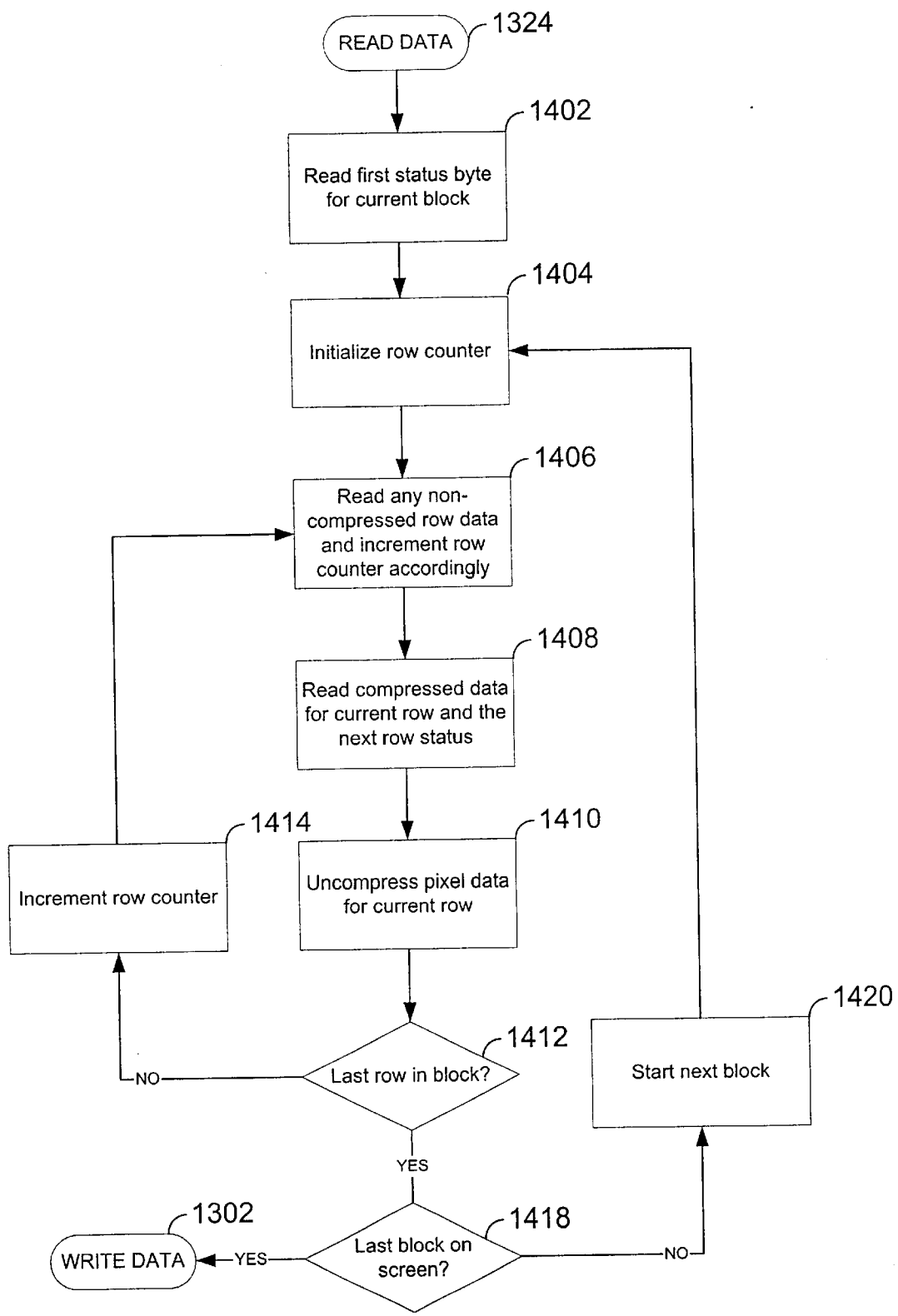
FIG. 14 is a flowchart for a method of reading compressed graphics data from a buffer.

FIG. 14 is a flowchart for a method of reading compressed screen data from a buffer. An example method for decoding compressed screen data from a buffer using multiple decompression techniques is started is a step 1324 labeled 'READ DATA'. In a step 1402, the first status byte for the current block is read from the buffer. In a step 1404, a row counter is initialized (in an example embodiment, the row counter is initialized to the top row of the current block). In a step 1406, the status byte is decoded to determine the compression technique for the next compressed row, and how many non-compressed rows preceed the next compressed row. Any non-compressed rows are read and the row counter is incremented accordingly. In a step 1408, the compressed data for the current row and the status for the next compressed row are read from the buffer. In a step 1410, the compressed data is decompressed using the technique specified in the status byte. This final row of screen data may now be stored in a cache just prior to display. In a decision step 1412, if the current row is not the last row in the current block, in a step 1414, the row counter is incremented, and control is returned to step 1406. If the current row is the last row in the current block, control is passed to a decision step 1418. In a decision step 1418, if the current block is not the last block on the screen, in a step 1420, the next block is started, and control is returned to step 1404. If the current block is the last block on the screen, the method is complete for the current screen of data, and control may be passed to step 1302, where another screen of data may be encoded.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for displaying computer graphics data, comprising the steps of:
    (a) selecting a first compression technique;
    (b) selecting a second compression technique;
    (c) compressing a current row of pixels using both said first and second compression techniques producing a first compressed row data and a second compressed row data;
    (d) selecting either said first compressed row data or said second compressed row data based on a size of said first and second compressed row data;
    (e) storing said selected compressed row data for a previous row of pixels in a portion of frame buffer memory;
    (f) reserving a portion of frame buffer memory;
    (g) dividing said computer graphics data into blocks of pixels;
    (h) selecting a current block of pixels for processing;
    (i) initializing a row counter to represent a bottom row of pixels within said current block of pixels;
    (j) creating a status data for said current row of pixels for said selected compressed row data;
    (k) storing said status data for said previous row of pixels in said portion of frame buffer memory; and
    (l) decrementing said row counter.

2. The method recited in claim 1, wherein steps (c) through (e), and (j) through (l) are repeated for each row of pixels within said current block of pixels.

3. The method recited in claim 2, wherein steps (c) through (e), and (h) through (l) are repeated for each block of pixels within said graphics data.

4. The method recited in claim 3, wherein said selecting compressed data step also includes the possibility of selecting non-compressed row data.

5. The method recited in claim 4, wherein said status data includes a number of non-compressed rows.

6. The method recited in claim 5, wherein said status data for said current row of pixels is stored with said compressed row data for a next row of pixels.

7. The method recited in claim 6, wherein said status data for a top row of pixels is stored in an array of status data.

8. The method recited in claim 7, further comprising the steps of:
    (m) selecting a current output block of pixels;
    (n) initializing an output row counter to represent a top row of pixels within said current output block of pixels;
    (o) reading a status data for said current output block of pixels from said array of status data;
    (p) reading compressed row data for a current output row of pixels within said current output block of pixels from said portion of frame buffer memory;
    (q) uncompressing said compressed row data for said current output row of pixels according to contents of said status data for said current output block of pixels;
    (r) reading a status data for a next output row of pixels from said compressed row data for said current output row of pixels;
    (s) incrementing said output row counter;
    (t) repeating steps (p) through (s) for each row of pixels in said current block of pixels; and
    (u) repeating steps (m) through (t) for each block of pixels in said graphics data.

9. The method recited in claim 1, wherein said first compression technique is a color map compression technique; and wherein said second compression technique is a variable delta compression technique.

10. The method recited in claim 9, wherein said selecting compressed data step also includes the possibility of selecting non-compressed row data.

11. The method recited in claim 10, wherein said status data includes a number of non-compressed rows.

12. The method recited in claim 11, wherein said status data for said current row of pixels is stored with said compressed row data for a next row of pixels.

13. The method recited in claim 12, wherein said status data for a top row of pixels is stored in an array of status data.

14. The method recited in claim 13, further comprising the steps of:
    (m) selecting a current output block of pixels;
    (n) initializing an output row counter to represent a top row of pixels within said current output block of pixels;
    (o) reading a status data for said current output block of pixels from said array of status data;

(p) reading compressed row data for a current output row of pixels within said current output block of pixels from said portion of frame buffer memory;

(q) uncompressing said compressed row data for said current output row of pixels according to contents of said status data for said current output block of pixels;

(r) reading a status data for a next output row of pixels from said compressed row data for said current output row of pixels;

(s) incrementing said output row counter.

15. The method recited in claim 14, wherein steps (p) through (s) are repeated for each row of pixels in said current block of pixels.

16. The method recited in claim 15, wherein steps (m) through (s) are repeated for each block of pixels in said graphics data.

17. A method for displaying computer graphics data, comprising the steps of:

(a) selecting a first compression technique;

(b) selecting a second compression technique;

(c) reserving a portion of frame buffer memory;

(d) dividing said computer graphics data into blocks of pixels;

(e) selecting a current block of pixels for processing;

(f) initializing a row counter to represent a bottom row of pixels within said current block of pixels;

(g) compressing a current row of pixels using both said first and second compression techniques producing a first compressed row data and a second compressed row data;

(h) selecting either said first compressed row data or said second compressed row data based on a size of said first and second compressed row data;

(i) creating a status data for said current row of pixels for said selected compressed row data;

(j) storing said selected compressed row data and said status data for a previous row of pixels in said portion of frame buffer memory; and (k) decrementing said row counter.

18. The method recited in claim 17, wherein steps (g) through (k) are repeated for each row of pixels within said current block of pixels.

19. The method recited in claim 18, wherein steps (e) through (k) are repeated for each block of pixels within said graphics data.

20. The method recited in claim 19, wherein said selecting compressed data step also includes the possibility of selecting non-compressed row data.

21. The method recited in claim 20, wherein said status data includes a number of non-compressed rows.

22. The method recited in claim 21, wherein said status data for said current row of pixels is stored with said compressed row data for a previous row of pixels.

23. The method recited in claim 22, wherein said status data for a top row of pixels is stored in an array of status data.

24. The method recited in claim 23, further comprising the steps of:

(l) selecting a current output block of pixels;

(m) initializing an output row counter to represent a top row of pixels within said current output block of pixels;

(n) reading a status data for said current output block of pixels from said array of status data;

(o) reading compressed row data for a current output row of pixels within said current output block of pixels from said portion of frame buffer memory;

(p) uncompressing said compressed row data for said current output row of pixels according to contents of said status data for said current output block of pixels;

(q) reading a status data for a next output row of pixels from said compressed row data for said current output row of pixels;

(r) incrementing said output row counter;

(s) repeating steps (n) through (r) for each row of pixels in said current output block of pixels; and (t) repeating steps (l) through (s) for each block of pixels in said graphics data.

25. The method recited in claim 17, wherein said first compression technique is a color map compression technique; and wherein said second compression technique is a variable delta compression technique.

26. The method recited in claim 25, wherein said selecting compressed data step also includes the possibility of selecting non-compressed row data.

27. The method recited in claim 26, wherein said status data includes a number of non-compressed rows.

28. The method recited in claim 27, wherein said status data for said current row of pixels is stored with said compressed row data for a previous row of pixels.

29. The method recited in claim 28, wherein said status data for a top row of pixels is stored in an array of status data.

30. The method recited in claim 29, further comprising the steps of:

(l) selecting a current output block of pixels;

(m) initializing an output row counter to represent a top row of pixels within said current output block of pixels;

(n) reading a status data for said current output block of pixels from said array of status data;

(o) reading compressed row data for a current output row of pixels within said current output block of pixels from said portion of frame buffer memory;

(p) uncompressing said compressed row data for said current output row of pixels according to contents of said status data for said current output block of pixels;

(q) reading a status data for a next output row of pixels from said compressed row data for said current output row of pixels;

(r) incrementing said output row counter.

31. The method recited in claim 30, wherein steps (n) through (r) are repeated for each row of pixels in said current block of pixels.

32. The method recited in claim 31, wherein steps (l) through (r) are repeated for each block of pixels in said graphics data.

33. A method for displaying computer graphics data, comprising the steps of:

(a) selecting a current block of pixels for processing;

(b) initializing a row counter to represent a bottom row of pixels within said current block of pixels;

(c) storing a graphics data for said bottom row of pixels in a memory;

(d) decrementing said row counter;

(e) storing a status data for a previous row of pixels in said memory;

(f) storing a graphics data for said current row of pixels in said memory;

(g) repeating steps (d) through (f) for each row of pixels within said current block of pixels;

(h) storing a status data for a top row of pixels in said memory;

(i) repeating steps (a) through (h) for each block of pixels within a screen of graphics data;

(j) selecting a current output block of pixels;

(k) initializing an output row counter to represent a top row of pixels within said current output block of pixels;

(l) reading a status data for said current output block of pixels from said memory;

(m) reading a status data for a next row of pixels from said memory;

(n) reading a graphics data for said top row of pixels from said memory;

(o) decrementing said row counter;

(p) repeating steps (m) through (o) for each row of pixels within said current block of pixels; and (q) repeating steps (j) through (p) for each block of pixels within a screen of graphics data.

* * * * *